United States Patent [19]

Hauber

[11] Patent Number: 5,448,557
[45] Date of Patent: Sep. 5, 1995

[54] ATM MULTIPLEXER/DEMULTIPLEXER FOR USE IN AN ATM SWITCHING SYSTEM

[75] Inventor: Clemens Hauber, Munich, Germany

[73] Assignee: Siemens Aktiengesellschaft, Munich, Germany

[21] Appl. No.: 294,331

[22] Filed: Aug. 23, 1994

[30] Foreign Application Priority Data

Aug. 27, 1993 [EP] European Pat. Off. ............ 93113740

[51] Int. Cl.⁶ ............................................ H04L 12/56
[52] U.S. Cl. .................... 370/60.1; 370/65.5; 370/112
[58] Field of Search .................. 370/54, 55, 56, 58.1, 370/58.2, 58.3, 60, 60.1, 65, 65.5, 94.1, 94.2, 112; 340/825.03, 826.827, 825.79, 825.8; 379/268, 271, 272, 273, 279, 291, 305, 335

[56] References Cited

U.S. PATENT DOCUMENTS

| | | | |
|---|---|---|---|
| 4,173,713 | 11/1979 | Giesken et al. | 370/65 |
| 4,635,250 | 1/1987 | Georgiou | 340/825.79 |
| 5,123,011 | 6/1992 | Hein et al. | 370/58.1 |
| 5,189,666 | 2/1993 | Kagawa | 370/60 |
| 5,189,668 | 2/1993 | Takatori et al. | 370/60 |
| 5,202,885 | 4/1993 | Schrodi et al. | 370/60 |
| 5,214,640 | 5/1993 | Sakurai et al. | 370/60 |
| 5,291,478 | 3/1994 | Grabowski et al. | 370/58.1 |
| 5,317,561 | 5/1994 | Fischer et al. | 370/60.1 |

FOREIGN PATENT DOCUMENTS

0323835 12/1989 European Pat. Off. .
0581991 9/1994 European Pat. Off. .

OTHER PUBLICATIONS

"Design of a Folded Banyan Switching Network with By-Pass Links Using a Distribution Cell Sequence Control", S. Okamoto, Electronics & Communications in Japan, Part I: Communications, 75 (1992) Jul., No. 7, New York, US, pp. 34–46.

"A Scalable ATM Switching System Architecture", W. Fischer et al, IEEE Journal on Selected Areas in Communications, vol. 9, No. 8, Oct. 1991, pp. 1299–1307.

"ATM ermöglicht unterschiedliche Bitraten im einheitlichen Breitbandnetz", Karl Anton Lutz, Siemens AG, Öffentliche Kommunikationssysteme, Telcom Report 11 (1988), pp. 210–213.

Primary Examiner—Alpus Hsu
Attorney, Agent, or Firm—Hill, Steadman & Simpson

[57] ABSTRACT

An ATM switching system has at least one ATM multiplexer/demultiplexer located between central office lines of a subscriber side and an ATM switching network. In the ATM multiplexer/demultiplexer the n outputs of a switching element, whose m·n inputs are connected to m·n input lines of the subscriber side, are connected to n output lines at the side of the switching network. Respectively n inputs of m switching elements, whose respectively n outputs are connected to respectively n output lines of the subscriber side, are connected to n input lines at the side of the switching network. The respectively remaining (m−1)·n inputs of these m switching elements are connected to the respectively n outputs of (m−1)·m additional switching elements whose respectively m·n inputs are connected to the m·n input lines of the subscriber side.

6 Claims, 1 Drawing Sheet

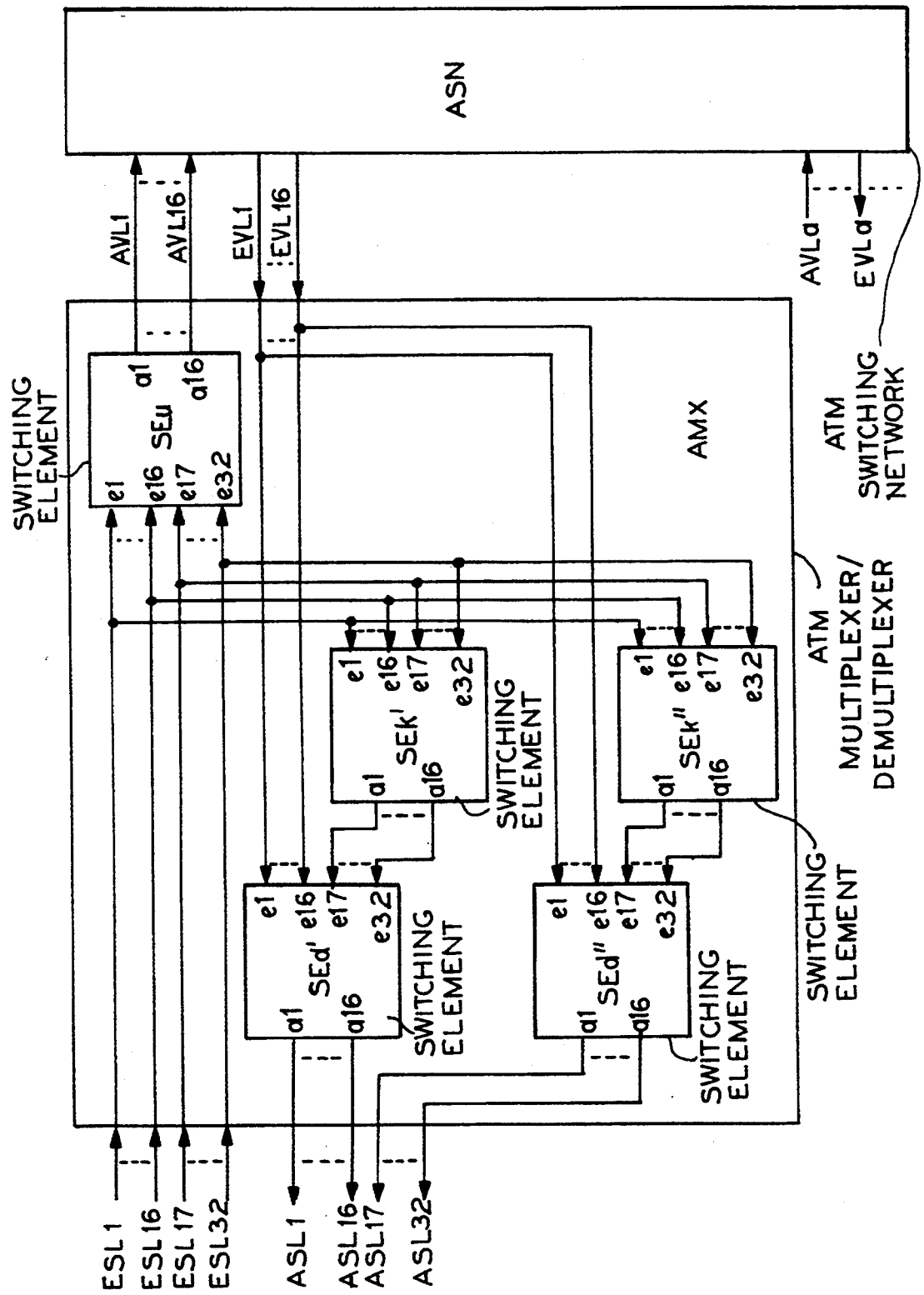

ATM MULTIPLEXER/DEMULTIPLEXER FOR USE IN AN ATM SWITCHING SYSTEM

BACKGROUND OF THE INVENTION

In present telecommunications technology the asynchronous transfer mode (ATM) based on asynchronous time-division multiplex technology plays a critical part in the development of integrated services broadband networks (B-ISDN). In this mode the signal transmission proceeds in a bit: stream that is subdivided into cells of a constant length of, for example, 53 octets, each of which is respectively composed of header and useful information part and that are occupied as needed with packeted messages. When no useful information is to be communicated, then specific empty cells are transmitted. Virtual connections, that is, connections that only use a path section when a message packet (block) is in fact to be transmitted thereover, are set up in ATM switching centers. Each packet contains, among other things, an address covering, for example, two octets in its header for the unambiguous allocation of the packet to a specific virtual connection. Based on the criterion of the respective selection information, every packet at the input to the switching network can thereby receive the complete information for its route through the switching network. The switching elements then automatically through-connect the packet on the defined route using this information (self-routing network, see, for example, Telcom Report 11 (1988) 6, 210...213). A two-stage reversing switching network having (2n×2n) ATM switching modules can thereby be provided as a switching network. These switching modules can in turn be respectively formed with a plurality of switching elements for switching (routing and queuing) ATM cells from 2·n simplex inputs via a preferably central ATM cell memory to n simplex outputs (IEEE Journal on Selected Areas in Communications, vol. 9, no. 8, October 1991, 1299...1307, FIGS. 3, 5, 7, 8). An ATM multiplexer/demultiplexer (that is, a multiplexer or a (de)multiplexer, as appropriate) can also be inserted between subscriber lines of the subscriber side and the ATM switching network. This multiplexer/demultiplexer can also be formed with a plurality of switching elements for switching (routing and queuing) ATM cells from 2·n simplex inputs via a preferably central ATM cell memory to n simplex outputs (IEEE Journal on Selected Areas in Communications, a.a.O., p. 1301 and FIG. 2).

It has already been disclosed (see U.S. Pat. No. 5,291,478) for such an ATM switching system to also through-connect short routes in the first stage of the ATM switching network via which the input lines are connected to output lines of the ATM switching network without making use of the second stage of the ATM switching network.

In an ATM switching system wherein an ATM multiplexer/demultiplexer also lies between subscriber lines of the subscriber side and the ATM switching network, the demand for short routes can also occur in such a multiplexer/demultiplexer. The present invention discloses a way to accomplish this.

SUMMARY OF THE INVENTION

The present invention is directed to an ATM switching system having at least one ATM multiplexer/demultiplexer located between subscriber lines of the subscriber side and an ATM switching network. The ATM switching network can be formed with a plurality of ATM switching modules that are arranged in stages and each respectively has as many simplex inputs as simplex outputs. An ATM switching module or, respectively, an ATM multiplexer/demultiplexer can be respectively formed with a plurality of switching elements for switching (routing and queuing) ATM cells from a plurality of preferably 2n simplex inputs via a preferably central ATM cell memory to a plurality of preferably n simplex outputs. Duplex central office lines are respectively established by a simplex input line and by a simplex output line. This ATM switching system inventively has the n outputs of a switching element in such an ATM multiplexer/demultiplexer, the m·n inputs (with m≧1) of the switching element being connected to m·n input lines of the subscriber side, connected to n output lines at the side of the switching network. Respectively n inputs of m switching elements, whose respective n outputs are connected to respectively n output lines of the subscriber side, are connected to n input lines of the switching network side. The respectively remaining (m−1)·n inputs of these m switching elements are connected to the respectively n outputs of (m−1)·m additional switching elements whose respectively m·n inputs are connected to the m·n input lines of the subscriber side.

In a further development of the present invention, m=2 can just apply, so that the n outputs of a switching element, whose 2n inputs are connected to 2n input lines of the subscriber side, are connected to n output lines at the side of the switching network in such an ATM multiplexer/demultiplexer. Respectively n inputs of two switching elements, whose respectively n outputs are connected to respectively n output lines of the subscriber side, are connected to n input lines at the side of the switching network. The respectively remaining n inputs of these two switching elements are connected to the respectively n outputs of two additional switching elements whose respective 2n inputs are respectively connected to the 2n input lines of the subscriber side.

The present invention yields the advantage that all connections running via the ATM switching network pass through the same minimum plurality of just one switching element (per transmission direction) in the ATM multiplexer/demultiplexer, this having a correspondingly beneficial influence on the overall delays. All short-route connections pass through exactly two switching elements in the ATM multiplexer/demultiplexer.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE shows an exemplary embodiment of an ATM switching system of the present invention.

DESCRIPTION OF THE PREFERRED EMBODIMENT

As depicted in the single Figure, one side of the ATM switching system has duplex central office lines, each of which is respectively established by a simplex input line ESL1,...,ESL16, ESL17,...,ESL32 and by a simplex output line ASL1, . . . ASL16, ASL17, . . . ,ASL32, and has an ATM switching network ASN at the other side. An ATM multiplexer/demultiplexer AMX lies between the central office lines ESL1/ASL1, . . . ,ESL32/ASL32 of the subscriber side and the ATM switching network ASN. As indicated in the single FIGURE, it is not only the ATM multiplexer/demultiplexer AMX that is connected to the ATM switching network ASN via its output lines AVL1 . . . AVL16 and input lines EVL1 . . . EVL16. On the contrary, let the ATM switching network ASN also be provided with a plurality of other central office lines AVLa, . . . , EVLa, . . . via which the ATM switching network ASN can be connected to other central office lines of the subscriber side, trunk lines, ATM multiplexers/demultiplexer, switching networks or other equipment.

At what is their respectively free end as depicted in the single Figure, the central office lines ESL1/ASL1 . . . ESL32/ASL32 can be broadband connected to a subscriber line module (SLMB) provided in subscriber-individual fashion (known, for example, from IEEE Journal on Selected Areas in Communications, a.a.O., FIG. 6) or to a digital interface unit (DIU), as is well known (for example, from IEEE Journal on Selected Areas in Communications, a.a.O., FIG. 2) and that therefore need not be set forth in greater detail here. The ATM switching network ASN can be formed with a plurality of ATM switching modules that are arranged in stages and each respectively has as many simplex inputs as simplex outputs, as is also well known (for example, from IEEE Journal on Selected Areas in Communications, a.a.O., FIGS. 7 and 8) and that likewise need not be set forth in greater detail here.

An ATM switching module can thereby be respectively formed with a plurality of switching elements for switching (routing and queuing) ATM cells from 2n simplex inputs via a preferably central ATM cell memory to n simplex outputs; this is also inherently known (for example, from IEEE Journal on Selected Areas in Communications, a.a.O., FIG. 5) and need not be set forth in greater detail here. Such ATM switching elements for switching (routing and queuing) ATM cells from a plurality of preferably 2n simplex inputs via a central ATM cell memory to a plurality of preferably n simplex outputs, finally, are likewise already known (for example, from Telcom Report 11 (1986) 6, 210 . . . 213, FIG. 5, and from IEEE Journal on Selected Areas in Communications, a.a.O., FIG. 3), so that this likewise does not require any more detailed comments here.

The ATM multiplexer/demultiplexer AMX is also formed with ATM switching elements (SEd',SEd",SEk',SEk", SEu) for switching (routing and queuing) ATM cells from a plurality of, preferably, 2n simplex inputs via a preferably central ATM cell memory to a plurality of, preferably, n simplex outputs.

When the (upstream) transmission direction from the input lines ESL1, . . . ESL16, ESL17, . . . ,ESL32 of the subscriber side to the output lines AVL1, . . . AVL16 of the switching side wherein the multiplexer/demultiplexer AMX takes effect in terms of its multiplexer function is first considered, then a switching element SEu is provided having n outputs a1, . . . a16 connected to the n output lines AVL1, . . . AVL16 at the side of the switching network and having m·n inputs e1, . . . ,e16, e17, . . . e32 (with m≧1) connected to the m·n input lines ESL1, . . . ,ESL16, ESL17, . . . ESL32 of the subscriber side. In the exemplary embodiment n=16, mn=32, and m=2.

In the opposite transmission direction (down stream) from the input lines EVL1, . . . EVL16 at the side of the switching network to the output lines ASL1, . . . ,ASL16, ASL17, . . . ,ASL32 of the subscriber side, wherein the ATM multiplexer/demultiplexer AMX is effect in terms of its demultiplexer function, two switching elements SEd' and SEd" are provided in the exemplary embodiment. The respectively first n inputs e1, . . . ,e16 thereof are connected to the input lines EVL1, . . . EVL16 at the side of the switching network and the respectively n outputs a1, . . . ,a16 thereof being connected to respectively n output lines ASL1, . . . ,ASL16 or, respectively, ASL17, . . . ,ASL32 of the subscriber side.

All connections that are conducted via the ATM switching network ASN and that emanate from the central office lines ESL1/ASL1, . . . ,ESL32/ASL32 of the subscriber side or, respectively, lead thereto proceed via the three switching elements SEu, SEd' and SEd". This will thereby primarily be a matter of connections to or, respectively, from the aforementioned, further central office lines EVLa/AVLa, . . . of the ATM switching network ASN. These connections traverse only exactly one switching element (SEu or, respectively, SEd) in the ATM multiplexer/demultiplexer AMX in each transmission direction.

In addition to such connections preceding via the ATM switching network ASN, particularly to/from the further central office lines EVLa/AVLa, . . . ,thereof, the ATM multiplexer/demultiplexer AMX depicted in the single Figure also enables short-route connections between input lines ESL1, . . . ESL32 and output lines ASL, . . . ASL32 of the subscriber side that are connected thereto. These short-route connections being through-connected only with the ATM multiplexer/demultiplexer AMX without touching upon the ATM switching network ASN. To this end, two additional ATM switching elements SEk', SEk" are provided in the exemplary embodiment, the respectively 2n inputs e1, . . . ,e16, e17, . . . ,e32 thereof being likewise connected to the 2n input lines ESL1, . . . ,ESL16, ESL17, . . . ,ESL32 of the subscriber side and the respectively n outputs a1, . . . ,a16 thereof leading to the respectively n other inputs e17, . . . ,e32 of the two aforementioned switching elements SEd' SEd" When, for example, the input line ESL1 of the subscriber side is to be connected to the output line ASL32 of the subscriber side, then such a connection need not be conducted via the ATM switching element SEu of the ATM multiplexer/demultiplexer AMX and one of its output lines AVL1, . . . ,AVL16 at the side of the switching network into the ATM switching network ASN and, from the latter, back via one of the input lines EVL1, . . . ,EVL16 of the ATM multiplexer/demultiplexer AMX at the side of the ATM switching network and the ATM switching element SEd" thereof. On the contrary, a short route can already be connected within the ATM multiplexer/demultiplexer AMX, this short route proceeding from the input line ESL1 of the subscriber side via the additional ATM switching element SEk" and, further, via the ATM switching element SEd" to the output line ASL32 of the subscriber side. In a corresponding fashion, for instance, the input line ESL32 of the subscriber side can also be connected to the output line ASL1 of the subscriber side.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An ATM switching system having at least one ATM multiplexer/demultiplexer located between central office lines of a subscriber side of the ATM switching system and an ATM switching network at a switching side of the ATM switching system, the ATM switching network having an equal number of simplex inputs and simplex outputs, the ATM multiplexer/demultiplexer having a plurality of switching elements for switching ATM cells from m·n simplex inputs thereof to n simplex outputs thereof, where n is a whole number greater than or equal to one and where m is a whole number greater than one, comprising:

a first switching element having m·n inputs connected to the m·n input lines of the subscriber side, and having n outputs connected to the n output lines at the switching side;

m second switching elements, each having m·n inputs and n outputs, each of said m second switching elements having respectively n outputs connected to respective n output lines of the subscriber side, and having respectively n inputs of said m·n inputs connected to n input lines at the switching side;

(m−1)·m additional switching elements, each having m·n inputs and n outputs; and respectively remaining (m−1)·n inputs of said m second switching elements connected to respective n outputs of said (m−1)·m additional switching elements, and respective m·n inputs of said (m−1)·m additional switching elements connected to m·n input lines at the subscriber side.

2. The ATM switching system according to claim 1, wherein m=2; wherein the n outputs of the first switching element, whose 2n inputs are connected to 2n input lines at the subscriber side, are connected to the n output lines at the switching side; wherein respectively n inputs of two second switching elements, whose respectively n outputs are connected to respectively n output lines of the subscriber side, are connected to n input lines at the switching side; and wherein the respectively remaining n inputs of said two second switching elements are connected to the respectively n outputs of two additional switching elements whose respectively 2n inputs are connected to the 2n input lines of the subscriber side.

3. An ATM multiplexer/demultiplexer for interconnecting a subscriber side in a switching system to a switching side in the switching system, comprising:

m·n input lines and m·n output lines at the subscriber side, where n is a whole number greater than zero and m is a whole number greater than one;

n input lines and n output lines at the switching side;

a plurality of switching elements;

a first switching element of the plurality of switching elements having m·n inputs connected to the m·n input lines at the subscriber side, and having n outputs connected to the n output lines at the switching side;

m second switching elements of the plurality of switching elements, each of said m second switching elements having m·n inputs and n outputs, each of said m second switching elements having n outputs respectively connected to respective n output lines of said m·n outputs at the subscriber side and having n inputs of the m·n inputs respectively connected to the n input lines at the switching side;

(m−1)·m additional switching elements of the plurality of switching elements, each having m·n inputs and n outputs; and respectively remaining (m−1)·n inputs of the m·n inputs of said m second switching elements connected to respective n outputs of said (m−1)·m additional switching elements, respective m·n inputs of said (m−1)·m additional switching elements being connected to the m·n input lines at the subscriber side.

4. The ATM multiplexer/demultiplexer according to claim 3, wherein m=2; wherein the n outputs of the first switching element, whose 2n inputs are connected to 2n input lines at the subscriber side, are connected to the n output lines at the switching side; wherein respectively n inputs of the respective 2n inputs of two second switching elements, whose respectively n outputs are connected to respectively n output lines of the 2n output lines at the subscriber side, are connected to the n input lines at the switching side; and wherein the respectively remaining n inputs of the respective 2n inputs of said two second switching elements are connected to the respectively n outputs of two additional switching elements whose respectively 2n inputs are connected to the 2n input lines at the subscriber side.

5. An ATM switching system having at least one ATM multiplexer/demultiplexer located between input and output lines at a subscriber side of the ATM switching system and an ATM switching network at a switching side of the ATM switching system, the ATM switching network having an equal number of input lines and output lines, the ATM multiplexer/demultiplexer having switching elements for switching ATM cells, comprising:

m·n input lines and m·n output lines at the subscriber side, where n is a whole number greater than zero and m is a whole number greater than one;

n input lines and n output lines at the switching side;

a plurality of switching elements;

a first switching element of the plurality of switching elements having m·n inputs connected to the m·n input lines at the subscriber side, and having n outputs connected to the n output lines at the switching side;

m second switching elements of the plurality of switching elements, each of said m second switching elements having m·n inputs and n outputs, each of said m second switching elements having n outputs respectively connected to respective n output lines of said m·n outputs at the subscriber side and having n inputs of the m·n inputs respectively connected to the n input lines at the switching side;

(m−1)·m additional switching elements of the plurality of switching elements, each having m·n inputs and n outputs; and respectively remaining (m−1)·n inputs of the m·n inputs of said m second switching elements connected to respective n outputs of said (m−1)·m additional switching elements, respective m·n inputs of said (m−1)·m additional switching elements being connected to the m·n input lines at the subscriber side.

6. The ATM switching system according to claim 5, wherein m=2; wherein the n outputs of the first switching element, whose 2n inputs are connected to 2n input lines at the subscriber side, are connected to the n output lines at the switching side; wherein respectively n inputs of the respective 2n inputs of two second switching elements, whose respectively n outputs are connected to respectively n output lines of the 2n output lines at the subscriber side, are connected to the n input lines at the switching side; and wherein the respectively remaining n inputs of the respective 2n inputs of said two second switching elements are connected to the respectively n outputs of two additional switching elements whose respectively 2n inputs are connected to the 2n input lines at the subscriber side.

* * * * *